United States Patent
Hsieh

(10) Patent No.: US 9,416,812 B2
(45) Date of Patent: Aug. 16, 2016

(54) NUT

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 14/551,087

(22) Filed: Nov. 24, 2014

(65) Prior Publication Data

US 2015/0147138 A1 May 28, 2015

(30) Foreign Application Priority Data

Nov. 27, 2013 (TW) ............................. 102222227 U

(51) Int. Cl.
| | |
|---|---|
| *F16B 31/00* | (2006.01) |
| *F16B 39/28* | (2006.01) |
| *F16B 31/02* | (2006.01) |
| *F16B 31/04* | (2006.01) |
| *F16B 33/02* | (2006.01) |
| *F16B 37/00* | (2006.01) |

(52) U.S. Cl.
CPC ................. *F16B 39/28* (2013.01); *F16B 31/02* (2013.01); *F16B 31/04* (2013.01); *F16B 33/02* (2013.01); *F16B 37/00* (2013.01)

(58) Field of Classification Search
CPC ........... F16B 37/00; F16B 39/28; F16B 31/02
USPC ....................................... 411/427, 437, 13, 14
See application file for complete search history.

(56) References Cited

U.S. PATENT DOCUMENTS

| | | | | |
|---|---|---|---|---|
| 341,146 | A | * | 5/1886 | Howes ........................ 411/366.1 |
| 1,969,796 | A | * | 8/1934 | Hoke ......................... 411/366.1 |
| 2,896,495 | A | * | 7/1959 | Crawford ..................... 411/437 |
| 3,382,637 | A | * | 5/1968 | Longinotti ....................... 52/320 |
| 3,383,974 | A | * | 5/1968 | Dahl ............................. 411/14 |
| 3,841,371 | A | * | 10/1974 | Thurston ...................... 411/276 |
| 5,139,380 | A | * | 8/1992 | Reynolds ..................... 411/437 |
| 2005/0117992 | A1 | * | 6/2005 | Evenrud ....................... 411/107 |
| 2010/0054891 | A1 | * | 3/2010 | Nishida et al. .................... 411/9 |

* cited by examiner

*Primary Examiner* — Flemming Saether
(74) *Attorney, Agent, or Firm* — CKC & Partners Co., Ltd.

(57) ABSTRACT

A nut includes a thread portion and a pressing portion. The thread portion is formed at an end of the nut. The thread portion includes a threaded inner wall surface for engaging with a screwing shaft of a screwing piece. The pressing portion is extended from the thread portion and formed at the other end of the nut. A wall thickness of the pressing portion is smaller than a wall thickness of the thread portion. An outer wall surface of the pressing portion is aligned with an outer wall surface of the thread portion.

4 Claims, 5 Drawing Sheets

NUT

RELATED APPLICATIONS

This application claims priority to Taiwan Application Serial Number 102222227, filed Nov. 27, 2013, which is herein incorporated by reference.

BACKGROUND

1. Technical Field

The present disclosure relates to a nut. More particularly, the present disclosure relates to a nut for preventing from loosening.

2. Description of Related Art

Screwing a screw with a nut to assemble two objects is widely applied to mechanical equipments, furniture, vehicles or lamps.

However, when the two objects assembled by screwing the screw and the nut are in a vibration state, such as in a traveling vehicle or in a running machine, an unexpected looseness may occur between the screw and the nut. Thus, the screw and the nut cannot be maintained in a tight engagement state, and damages or accidents may be caused. For example, the equipment having the objects may not be operated normally, or the operators of the equipment may be in danger.

For preventing the screw and the nut from loosening from each other, a gasket is usually disposed between the nut and the object abutting with the nut, and the tight engagement state between the screw and the nut can be effectively maintained. However, an extra component (the gasket) is needed for combing the two objects. Therefore, it is not favorable for simplifying the inventory management and enhancing the assembling efficiency.

SUMMARY

According to one aspect of the present disclosure, a nut includes a thread portion and a pressing portion. The thread portion is formed at an end of the nut. The thread portion includes a threaded inner wall surface for engaging with a screwing shaft of a screwing piece. The pressing portion is extended from the thread portion and formed at the other end of the nut. A wall thickness of the pressing portion is smaller than a wall thickness of the thread portion. An outer wall surface of the pressing portion is aligned with an outer wall surface of the thread portion.

According to another aspect of the present disclosure, a nut includes a thread portion and a pressing portion. The thread portion is formed at an end of the nut. The thread portion includes a threaded inner wall surface for engaging with a screwing shaft of a screwing piece. At least one groove is recessedly formed on the threaded inner wall surface, and the groove is coaxial with the nut. The pressing portion is extended from the thread portion and formed at the other end of the nut. A wall thickness of the pressing portion is smaller than a wall thickness of the thread portion. An outer wall surface of the pressing portion is aligned with an outer wall surface of the thread portion.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
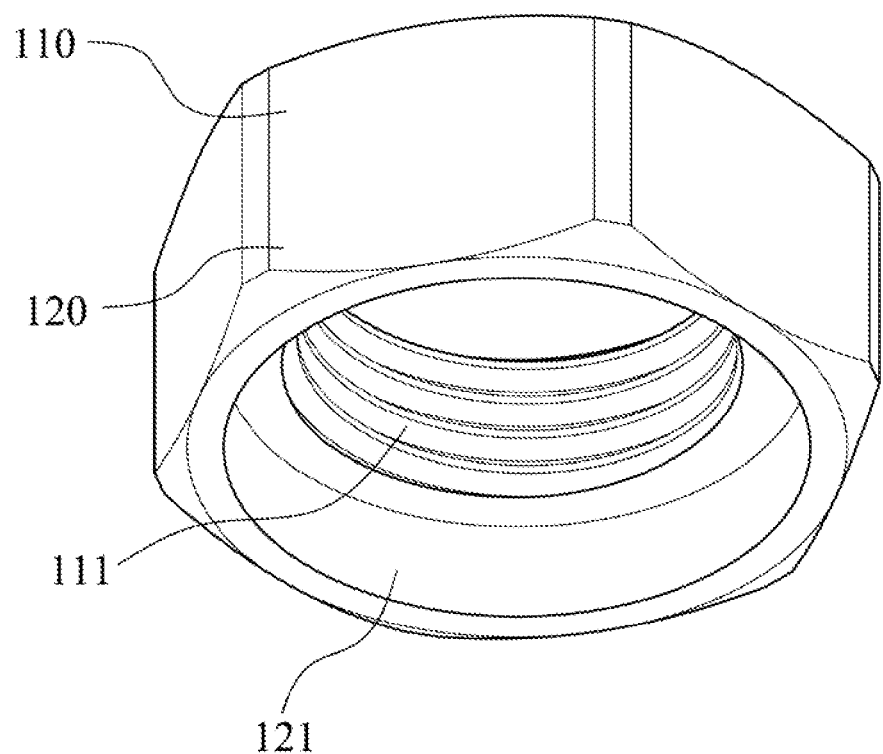
FIG. 1 is a three-dimensional view of a nut according to one embodiment of the present disclosure.
Figure 3:
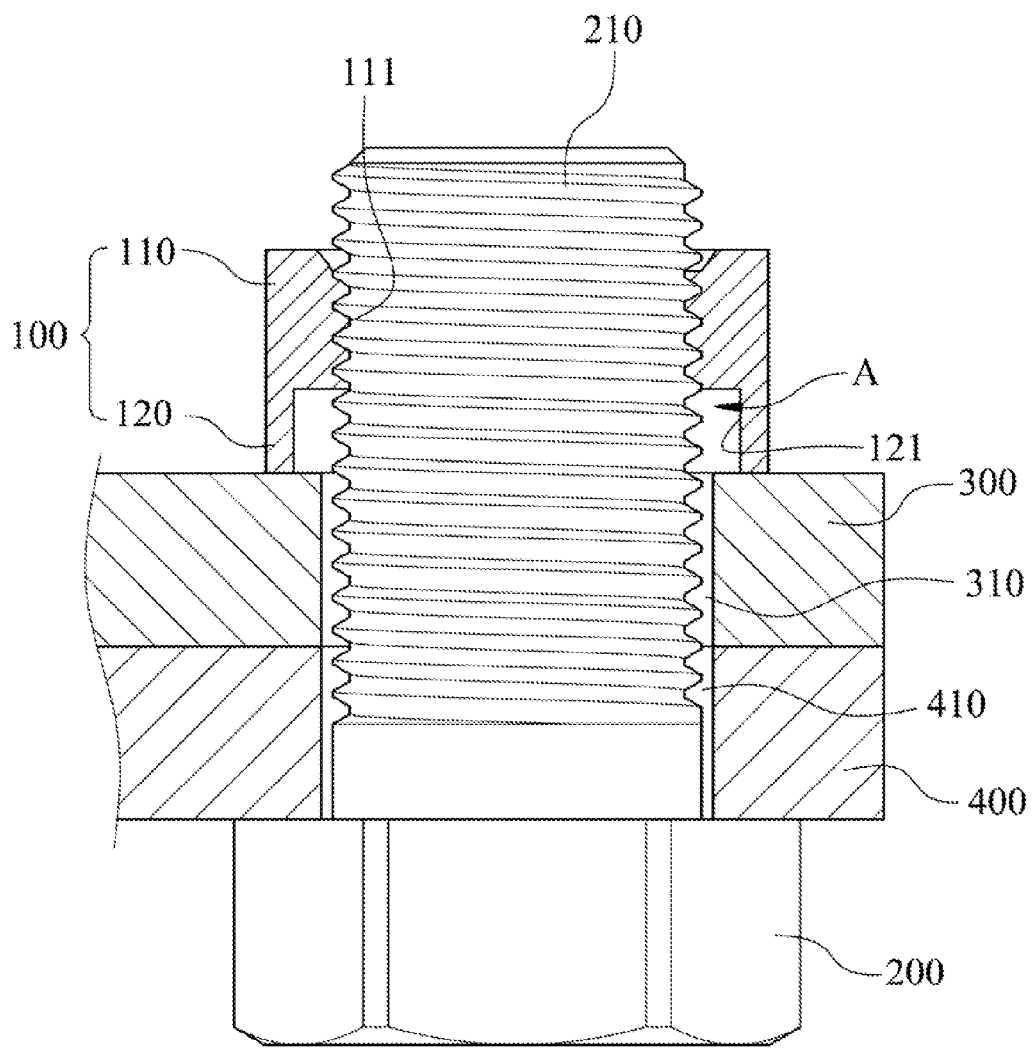
FIG. 3 is a schematic view of the nut of FIG. 2 in an operation state.

FIG. 1 is a three-dimensional view of a nut 100 according to one embodiment of the present disclosure. In FIG. 1, the nut 100 includes a thread portion 110 and a pressing portion 120. The thread portion 110 is formed at an end of the nut 100, and the thread portion 110 includes a threaded inner wall surface 111 for engaging with a screwing shaft 210 of a screwing piece 200 (as shown in FIG. 3). The pressing portion 120 is extended from the thread portion 110 and formed at the other end of the nut 100. In other words, the thread portion 110 and the pressing portion 120 are formed integrally. The aforementioned "screwing piece 200" is a fastener has a thread portion on the screwing shaft 210 thereof, such as a screw or a bolt, and the thread portion of the screwing piece 200 is mated with the thread portion 110 of the nut 100. In the embodiment, the nut 100 is substantially formed in a hexagonal shape, i.e., the nut 100 is a hex nut, which can be driven by a wrench (not shown) or a hex socket (not shown) so as to be fastened or loosened. In other embodiment, the nut 100 can be substantially formed in a square shape or other shapes according to practical needs.

Figure 2:
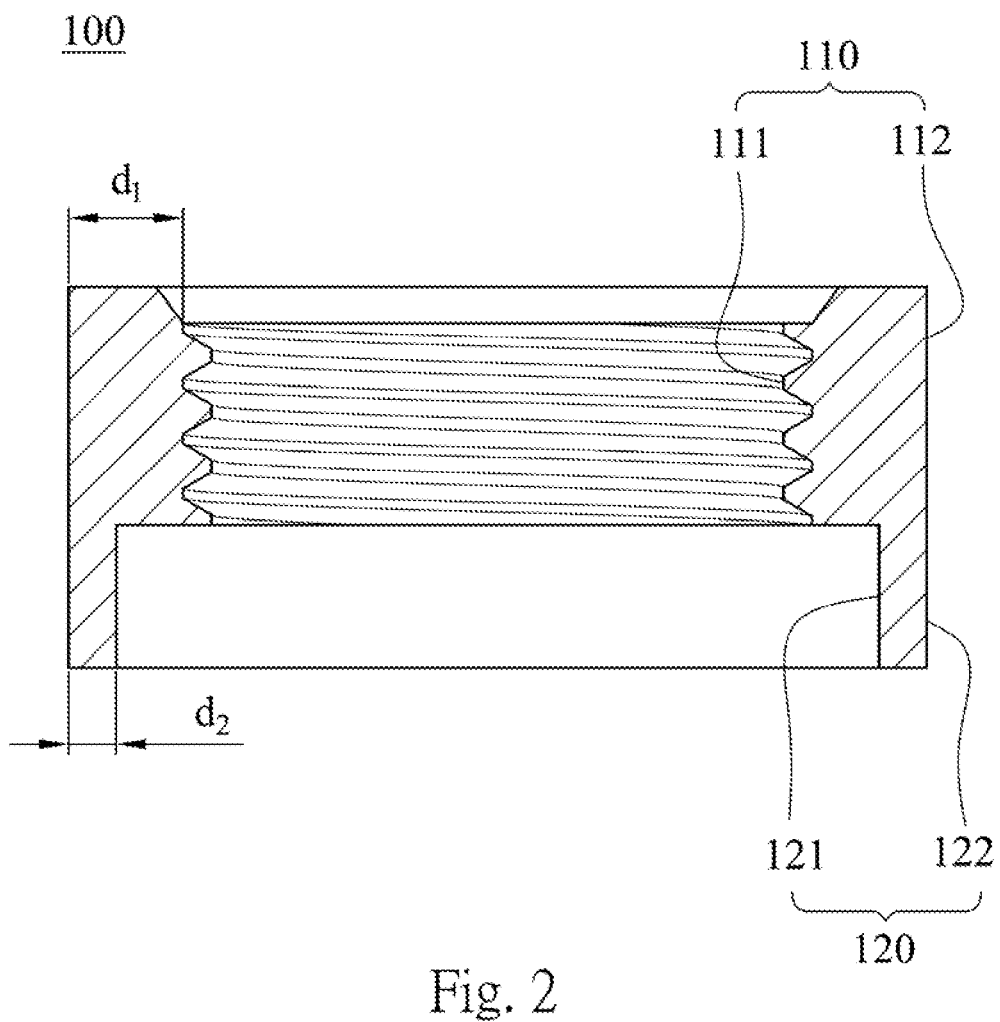
FIG. 2 is a cross-sectional view of the nut of FIG. 1.

FIG. 2 is a cross-sectional view of the nut 100 of FIG. 1. In FIG. 2, a wall thickness d2 of the pressing portion 120 is smaller than a wall thickness d1 of the thread portion 110. Therefore, a deformation of the pressing portion 120 can be easily caused when an external force is applied thereon. An outer wall surface 122 of the pressing portion 120 is aligned with an outer wall surface 112 of the thread portion 110, which means that the outer wall surface 122 of the pressing portion 120 and the outer wall surface 112 of the thread portion 110 are located on the same plane. Therefore, a larger force area can be provided by the nut 100, which is favorable for fastening or loosening the nut 100 by a fastening tool (not shown), such as a wrench.

FIG. 3 is a schematic view of the nut 100 of FIG. 2 in an operation state. In FIG. 3, the screwing piece 200 is a screw. When the nut 100 and the screwing piece 200 are used to assemble a first object 300 and a second object 400, the screwing shaft 210 of the screwing piece 200 is passed through a through hole 410 of the second object 400, a through hole 310 of the first object 300 and the pressing portion 120 of the nut 100. Then the screwing piece 200 and/or the nut 100 is rotated, so that the threaded inner wall surface 111 of the nut 100 can be engaged with the screwing shaft 210 of the screwing piece 200. The screwing piece 200 and/or the nut 100 is kept being rotated when the pressing portion 120 abuts against the first object 300. Thus a deformation of the pressing portion 120 is caused owing to the smaller wall thickness d2 thereof. As a result, the pressing degree between the nut 100 and the first object 300 can be enhanced. Accordingly, the nut 100 can be tightly engaged with the screwing piece 200, and the tight engagement state between the nut 100 and the screwing piece 200 can be maintained. The thread portion 110 and the pressing portion 120 of the nut 100 are formed integrally, which effectively prevents the nut 100 and the screwing piece 200 from loosening from each other, even without a gasket disposed between the nut 100 and the first object 300. Therefore, the inventory management can be simplified and the assembling efficiency can be enhanced.

Figure 4:
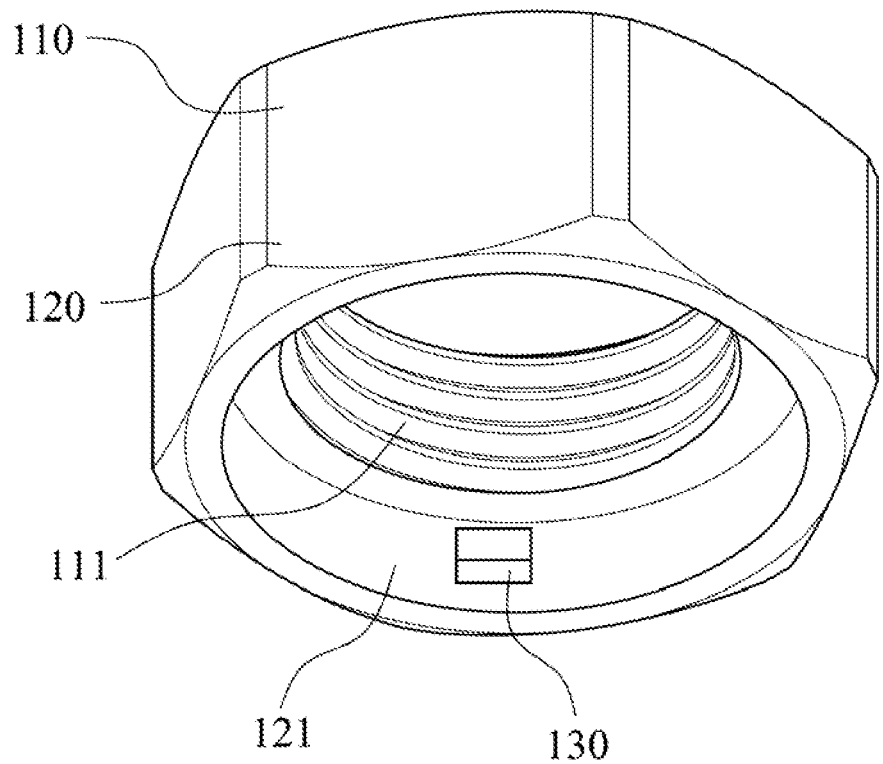
FIG. 4 is a three-dimensional view of a nut according to another embodiment of the present disclosure.

FIG. 4 is a three-dimensional view of a nut 100 according to another embodiment of the present disclosure. The nut 100 includes a thread portion 110 and a pressing portion 120. The nut 100 further includes a stress detection piece 130. The stress detection piece 130 is disposed on an inner wall surface 121 of the pressing portion 120. A wall thickness of the pressing portion 120 is smaller than a wall thickness of the thread portion 110, and an outer wall surface of the pressing portion 120 is aligned with an outer wall surface of the thread portion 110. Accordingly, when the nut 100 is engaged with the screwing piece 200 (as shown in FIG. 3), a space A (as shown in FIG. 3) is formed between the inner wall surface 121 of the pressing portion 120 and the screwing shaft 210 of the screwing piece 200, which is favorable for disposing the stress detection piece 130. In other words, it is not necessary to process the nut 100 for forming an extra accommodating space thereon so as to dispose the stress detection piece 130. Therefore, the manufacturing steps and the manufacturing time of the nut 100 can be reduced.

Figure 5:
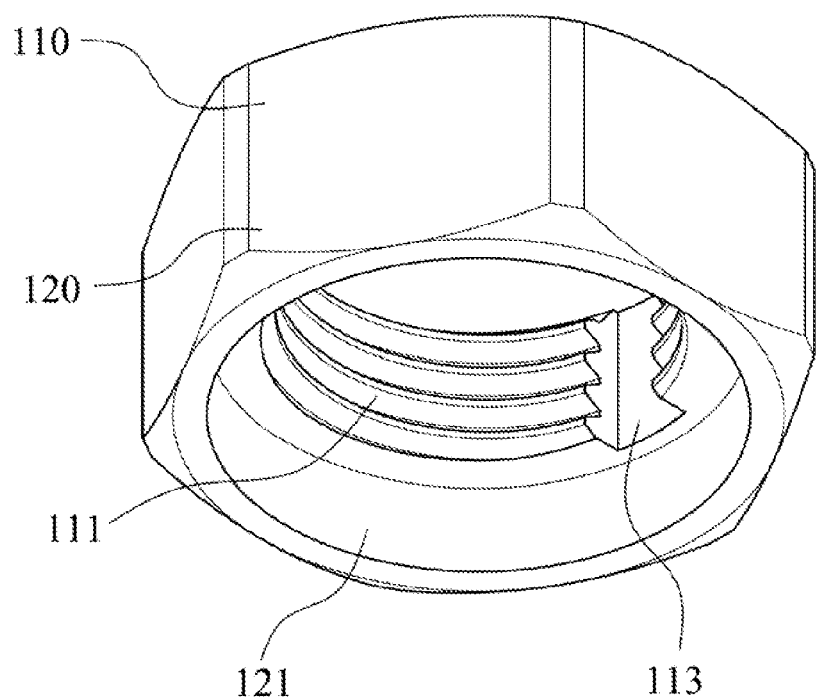
FIG. 5 is a three-dimensional view of a nut according to yet another embodiment of the present disclosure.

FIG. 5 is a three-dimensional view of a nut 100 according to yet another embodiment of the present disclosure. Two grooves 113 (only one of the grooves 113 is shown) are recessedly formed on a threaded inner wall surface 111 of the nut 100. The grooves 113 are coaxial with the nut 100, and the grooves 113 are symmetrically formed on the threaded inner wall surface 111. Therefore, a deformation of the nut 100 along a radial direction thereof can be caused easily, which can further reinforce the engagement state between the nut 100 and the screwing shaft 210 of the screwing piece 200 (as shown in FIG. 3). The aforementioned "radial direction" is a direction from an axis of the nut 100 to an outer wall surface of the pressing portion 120 or an outer wall surface of the thread portion 110, and the radial direction is perpendicular to the axis of the nut 100. The nut 100 can further include the stress detection piece 130 (as shown in FIG. 4). The stress detection piece 130 can be disposed on the inner wall surface 121 of the pressing portion 120 or one of the grooves 113 of the threaded inner wall surface 111. Therefore, it is not necessary to process the nut 100 for forming an extra accommodating space thereon so as to dispose the stress detection piece 130, and the manufacturing steps and the manufacturing time of the nut 100 can be reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A nut, comprising:
   a thread portion formed at an end of the nut, wherein the thread portion comprises a threaded inner wall surface for engaging with a screwing shaft of a screwing piece;
   a pressing portion extended from the thread portion and formed at the other end of the nut, wherein a wall thickness of the pressing portion is smaller than a wall thickness of the thread portion, and an outer wall surface of the pressing portion is aligned with an outer wall surface of the thread portion; and
   a stress detection piece disposed on an inner wall surface of the pressing portion;
   wherein the outer wall surface of the thread portion is a continuous outer surface without interruptions.

2. The nut of claim 1, wherein the nut is formed in a hexagonal shape.

3. A nut, comprising:
   a thread portion formed at an end of the nut, wherein the thread portion comprises a threaded inner wall surface for engaging with a screwing shaft of a screwing piece, at least one groove is recessedly formed on the threaded inner wall surface, and the groove is coaxial with the nut;
   a pressing portion extended from the thread portion and formed at the other end of the nut, wherein a wall thickness of the pressing portion is smaller than a wall thickness of the thread portion, and an outer wall surface of the pressing portion is aligned with an outer wall surface of the thread portion; and
   a stress detection piece disposed on an inner wall surface of the pressing portion;
   wherein the outer wall surface of the thread portion is a continuous outer surface without interruptions.

4. The nut of claim 3, wherein the nut is formed in a hexagonal shape.

* * * * *